(12) United States Patent
Zhou et al.

(10) Patent No.: US 10,818,027 B2
(45) Date of Patent: Oct. 27, 2020

(54) METHOD AND APPARATUS FOR EXTRACTING CENTERLINE OF TUBULAR OBJECT

(71) Applicant: Shenzhen Institutes of Advanced Technology Chinese Academy of Sciences, Nanshan District, Shenzhen (CN)

(72) Inventors: Shoujun Zhou, Shenzhen (CN); Baolin Li, Shenzhen (CN); Cheng Wang, Shenzhen (CN); Pei Lu, Shenzhen (CN)

(73) Assignee: SHENZHEN INSTITUTES OF ADVANCED TECHNOLOGY CHINESE ACADEMY OF SCIENCES, Shenzhen, Guangdong (CN)

( * ) Notice: Subject to any disclaimer, the term of this patent is extended or adjusted under 35 U.S.C. 154(b) by 176 days.

(21) Appl. No.: 16/077,523

(22) PCT Filed: May 24, 2017

(86) PCT No.: PCT/CN2017/085704
§ 371 (c)(1),
(2) Date: Aug. 13, 2018

(87) PCT Pub. No.: WO2018/214053
PCT Pub. Date: Nov. 29, 2018

(65) Prior Publication Data
US 2020/0175711 A1 Jun. 4, 2020

(51) Int. Cl.
*G06T 7/66* (2017.01)
*G06T 7/12* (2017.01)
(Continued)

(52) U.S. Cl.
CPC ............. *G06T 7/66* (2017.01); *G06T 7/12* (2017.01); *G06T 7/149* (2017.01); *G06T 7/269* (2017.01);
(Continued)

(58) Field of Classification Search
CPC .. G06T 7/66; G06T 7/269; G06T 7/12; G06T 7/149; G06T 2207/20116; G06T 2207/30172
See application file for complete search history.

(56) References Cited

U.S. PATENT DOCUMENTS

| 9,336,566 B2 | 5/2016 | Choy et al. |
| 2011/0026793 A1* | 2/2011 | Goel ................ G06T 7/13 382/131 |

FOREIGN PATENT DOCUMENTS

| CN | 102110286 A | 6/2011 |
| CN | 102903115 A | 1/2013 |

(Continued)

OTHER PUBLICATIONS

Wang et al, "Novel 4-D Open-Curve Active Contour and Curve Completion Approach for Automated Tree Structure Extraction", Proceedings/CVPR, IEEE Computer Society Conference on Computer Vision and Pattern Recognition. pp. 1105-1112, Jul. 2011 (Year: 2011).*

(Continued)

*Primary Examiner* — Qian Yang
(74) *Attorney, Agent, or Firm* — Woodard, Emhardt, Henry, Reeves & Wagner, LLP

(57) ABSTRACT

A method and an apparatus for extracting a centerline of a tubular object are provided. The method includes: preprocessing an image of the tubular object whose centerline is to be extracted to obtain an enhanced image, acquiring a gradient vector flow field of the enhanced image; acquiring a deformation force parameter based on the gradient vector flow field and extracting ridge points of the tubular object from the enhanced image, establishing a regularized open curve deformable model; if a deformation end condition is not met, deforming and processing one ridge line segment in the initial ridge line segment list based on the model to (Continued)

obtain a centerline segment of the tubular object, updating the initial ridge line segment list based on the ridge line segment traversed; if the deformation end condition is met, generating a centerline of the tubular object based on the centerline segments.

10 Claims, 2 Drawing Sheets

(51) Int. Cl.
G06T 7/269 (2017.01)
G06T 7/149 (2017.01)

(52) U.S. Cl.
CPC ............... G06T 2207/20116 (2013.01); G06T 2207/30172 (2013.01)

(56) References Cited

FOREIGN PATENT DOCUMENTS

CN 106537451 A 3/2017
JP 2012-003432 * 1/2012

OTHER PUBLICATIONS

Machine translation for JP 2012-003432 (Year: 2012).*

* cited by examiner

METHOD AND APPARATUS FOR EXTRACTING CENTERLINE OF TUBULAR OBJECT

TECHNICAL FIELD

The present disclosure belongs to the technical field of computers, and particularly relates to a method and an apparatus for extracting a centerline of a tubular object.

BACKGROUND

Quantitative extraction of a centerline has extremely important significance for the description of characteristics of a tubular object and the development of virtual reality and augmented reality technologies. For example, with respect to medical images served as computer-aided diagnosis and treatment, a centerline of a blood vessel of interest is extracted to effectively analyze a structure and nidus of the blood vessel and further determine lumen damage and establish an interventional operative pathway, thereby providing necessary assistance and guidance for the treatment of cardiovascular and cerebrovascular diseases.

There are many algorithms for extracting a centerline of a tubular object in a noise image, such as a centerline extraction method based on a shortest path, a centerline extraction method based on topological thinning, a centerline extraction method based on distance transformation, a centerline extraction method based on tracking, and a method based on an open snake deformable model. The centerline extraction method based on the shortest path is low in computation effort, but the centerline is not accurately located at the center of an object and needs to be adjusted later. The centerline extraction method based on topological thinning is computationally intensive and relatively susceptible to image quality. The centerline extraction method based on tracking is high in computation speed, but is incomplete in acquisition of the centerline. The above methods often lead to incorrect information about the centerline in parts with relatively large changes in curvature or more branches.

In recent years, attention has been focused on the centerline extraction method based on an open snake deformable model, which is a parameter model describing a deformation rule of a non-closed curve with an open end, and the curve is drawn to approach the tubular object by applying deformation forces on both sides of an open deformation curve. However, an existing open snake deformable model is long in deformation time, and has problems such as under-evolution, over-evolution, and deviation from the target in a deformation process. Moreover, a point coordinate vector description has problems of unequal interval and low accuracy.

SUMMARY

The present disclosure aims to provide a method and an apparatus for extracting a centerline of a tubular object, so as to solve problems of low extraction accuracy and low extraction rate of the centerline due to long deformation time, difficulty in control over a deformation process, and low deformation accuracy of an existing open snake deformable model.

In one aspect, the present disclosure provides a method for extracting a centerline of a tubular object. The method includes the following steps:

preprocessing, through a preset tubular object enhancement algorithm, an image of the tubular object whose centerline is to be extracted to obtain an enhanced image of the tubular object, and acquiring a gradient vector flow field of the enhanced image through a preset iterative algorithm;

extracting, based on the gradient vector flow field, ridge points of the tubular object from the enhanced image and generating an initial ridge line segment list, acquiring a deformation force parameter corresponding to the initial ridge line segment list based on the gradient vector flow field, and establishing a regularized open snake deformable model based on the initial ridge line segment list and the deformation force parameter;

if a preset deformation end condition is not met, deforming one ridge line segment in the initial ridge line segment list based on the regularized open snake deformable model, uniformly smoothing a sequence of points of the ridge line segment deformed through a preset smoothing algorithm to obtain a centerline segment, corresponding to the deformed ridge line segment, of the tubular object, and updating the initial ridge line segment list based on the ridge line segment traversed in a deformation process of the ridge line segments; and generating the centerline of the tubular object based on all the centerline segments of the tubular object obtained if the deformation end condition is met.

In another aspect, the present disclosure provides an apparatus for extracting a centerline of a tubular object. The apparatus includes:

an object preprocessing unit configured to preprocess, through a preset tubular object enhancement algorithm, an image of a tubular object whose centerline is to be extracted to obtain an enhanced image of the tubular object, and acquire a gradient vector flow field of the enhanced image through a preset iterative algorithm;

a model establishing unit configured to extract, based on the gradient vector flow field, ridge points of the tubular object from the enhanced image and generate an initial ridge line segment list, acquire a deformation force parameter corresponding to the initial ridge line segment list based on the gradient vector flow field, and establish a regularized open snake deformable model based on the initial ridge line segment list and the deformation force parameter;

a ridge line segment deforming unit configured to: if a preset deformation end condition is not met, deform one ridge line segment in the initial ridge line segment list based on the regularized open snake deformable model, uniformly smooth a sequence of points of the ridge line segment deformed through a preset smoothing algorithm to obtain a centerline segment, corresponding to the deformed ridge line segment, of the tubular object, and update the initial ridge line segment list based on the ridge line segment traversed in the deformation process of the ridge line segments; and a centerline generating unit configured to generate the centerline of the tubular object based on all the centerline segments of the tubular object obtained if the deformation end condition is met.

According to the present disclosure, an image of a tubular object whose centerline is to be extracted is preprocessed through a preset tubular object enhancement algorithm to obtain an enhanced image of the tubular object, and a gradient vector flow field of the enhanced image is acquired through a preset iterative algorithm; ridge points of the tubular object are extracted from the enhanced image based on the gradient vector flow field, and an initial ridge line segment list is generated; a deformation force parameter corresponding to the initial ridge line segment list is acquired based on the gradient vector flow field, and a regularized open snake deformable model is established based on the initial ridge line segment list and the deformation force parameter; if a preset deformation end condition is not met, one ridge line segment in the initial ridge line segment list is deformed based on the regularized open snake deformable model, a sequence of points of the ridge line segment deformed is uniformly smoothed through a preset smoothing algorithm to obtain a centerline segment, corresponding to the deformed ridge line segment, of the tubular object, and the initial ridge line segment list is updated based on the ridge line segment traversed in the deformation process of the ridge line segments; and if the deformation end condition is met, the centerline of the tubular object is generated based on all the centerline segments of the tubular object obtained. Accordingly, the deformation process of the ridge line segments is optimized, the deformation time of the ridge line segments is reduced, and the extraction accuracy and the extraction rate of the centerline are improved.

DETAILED DESCRIPTION

In order to make the objective, the technical solution, and the advantages of the present disclosure clearer and more comprehensible, the present disclosure will be described in detail with reference to accompanying drawings and embodiments. It should be understood that specific embodiments described herein are only used to explain the present disclosure and are not intended to limit the present disclosure.

Specific implementations of the present disclosure will be described in detail with reference to specific embodiments.

Embodiment I

Figure 1:
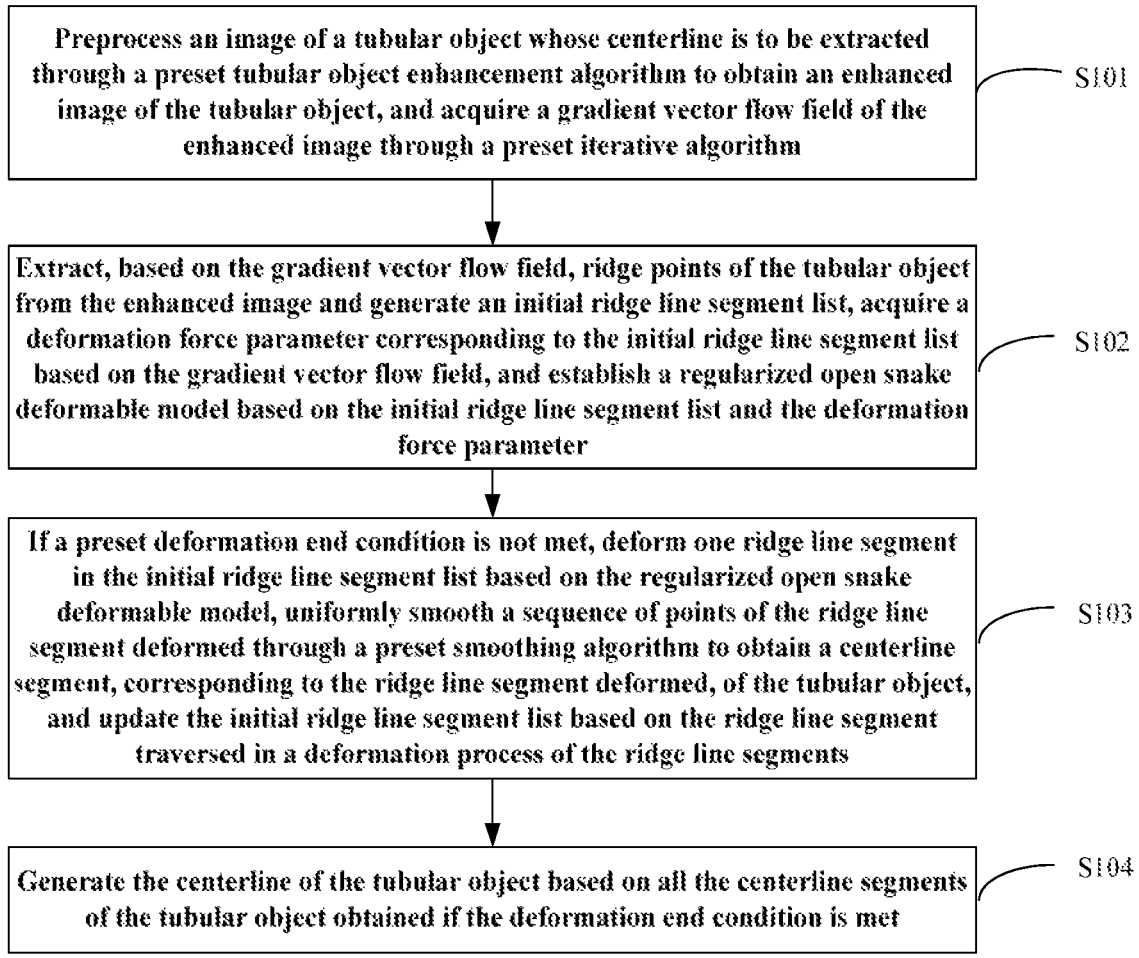
FIG. 1 is a flow diagram illustrating a method for extracting a centerline of a tubular object according to Embodiment I of the present disclosure.

FIG. 1 is a flow diagram illustrating a method for extracting a centerline of a tubular object according to Embodiment I of the present disclosure. For the convenience of description, only parts related to the embodiment of the present disclosure are shown, which will be described in detail as follows.

In step S101, an image of a tubular object whose centerline is to be extracted is preprocessed through a preset tubular object enhancement algorithm to obtain an enhanced image of the tubular object, and a gradient vector flow field of the enhanced image is acquired through a preset iterative algorithm.

In the embodiment of the present disclosure, when the image of the tubular object whose centerline is to be extracted is preprocessed, an existing tubular object enhancement algorithm such as a multi-scale filtering algorithm may be used to suppress a background noise in the image of the tubular object whose centerline is to be extracted and increase the brightness of the tubular object in the image, such that the center of the tubular object has higher image intensity information and the border and background of the tubular object have dim intensity information. After the enhanced image is obtained, the gradient vector flow field of the enhanced image is computed for describing a curved segment in the enhanced image. An existing iterative algorithm may be used to acquire the gradient vector flow field of the enhanced image.

In step S102, ridge points of the tubular object are extracted from the enhanced image based on the gradient vector flow field to generate an initial ridge line segment list; a deformation force parameter corresponding to the initial ridge line segment list is acquired based on the gradient vector flow field; and a regularized open snake deformable model is established based on the initial ridge line segment list and the deformation force parameter.

In the embodiment of the present disclosure, after the ridge points of the tubular object are extracted from the enhanced image, several line segments with a length of a preset number (for example, five) of volume pixels may be directly generated based on the ridge points to form the initial ridge line segment list, or longer ridge lines of the tubular object may be rapidly extracted by using ridge points tracking technology to form the initial ridge line segment list, where the volume pixel is the smallest unit of digital data in a three-dimensional space division, and is used in three-dimensional imaging, scientific data and medical imaging and other fields.

In the embodiment of the present disclosure, there are a total of N initialized ridge line segments (open snakes) in the generated initial ridge line segment list, and each snake is expressed as $C_n = [X, V, F_T]_n$, where $n = 1, 2, \ldots, N$, "X" represents a three-dimensional coordinate (x, y, z) of each point, "V" represents a unit direction vector $(v_x, v_y, v_z)$ of each point and "$F_T$" represents a GVF (gradient vector flow field) vector $(f_x, f_y, f_z)$ of each point. A dynamic data structure component of each open snake may be represented by the following matrix, where $M_n$ represents a length (pixel unit) of the snake:

$$\begin{bmatrix} x_1 & y_1 & z_1 & v_{x1} & v_{y1} & v_{z1} & f_{x1} & f_{y1} & f_{z1} \\ x_2 & y_2 & z_2 & v_{x2} & v_{y2} & v_{z2} & f_{x2} & f_{y2} & f_{z2} \\ M & M & M & M & M & M & M & M & M \\ x_{M_n} & y_{M_n} & z_{M_n} & v_{x_{M_n}} & v_{y_{M_n}} & v_{z_{M_n}} & f_{x_{M_n}} & f_{y_{M_n}} & f_{z_{M_n}} \end{bmatrix}.$$

Preferably, after the gradient vector flow field $E_\tau$ of the enhanced image is acquired, an image force $-\nabla E_\tau$ in the deformation force parameter is acquired based on the gradient vector flow field, so that the deformation accuracy is improved.

In step S103, if a preset deformation end condition is not met, one ridge line segment in the initial ridge line segment list is deformed based on the regularized open snake deformable model, and a sequence of points of the ridge line segment deformed is uniformly smoothed through a preset smoothing algorithm to obtain a centerline segment, corresponding to the ridge line segment deformed, of the tubular object, and the initial ridge line segment list is updated based on the ridge line segment traversed in the deformation process of the ridge line segments.

In the embodiment of the present disclosure, firstly, one ridge line segment in the initial ridge line segment list is deformed, and when the deformation is performed, a cyclic iterative computation is performed on the regularized open snake deformable model under the effect of deformation forces so as to deform this ridge line segment based a result of the computation. When an iteration stop condition is met, a deformed ridge line segment corresponding to this ridge line segment is obtained. Secondly, a sequence of points of the deformed ridge line segment is uniformly smoothed through a preset algorithm (for example, an equal interval interpolation algorithm) to obtain the centerline segment, corresponding to the deformed ridge line segment, of the tubular object. Finally, the initial ridge line segment list is updated based on ridge line segments traversed in the deformation process of the ridge line segment.

Particularly, the deformation force of the ridge line segment is computed according to a formula $F_{ext} = -\nabla E_\tau - k_S \nabla E_S$, where $-k_S \nabla E_S$ represents a tearing force. A point $X_i(x, y, z)$ on the ridge line segment moves in an iterative deformation process of the ridge line segment according to a formula $S_{i+1} = (A + \gamma I)^{-1}, (\gamma X_i - k_N F_N(X_i) - k_S F_S(X_i))$, where "t" represents a number of iterations and "A" represents a matrix composed of elastic coefficients and rigid coefficients, I represents a unit matrix, $\gamma$, $k^N$ and $k^S$ represent constants used to control a step length, balance an internal force and an external force, and balance the image force and the tearing force, "$F_N$" represents a force perpendicular to the centerline, and "$F_S$" represents a force along the centerline.

Preferably, when the initial ridge line segment list is updated based on the ridge line segment traversed in the deformation process of the ridge line segments, the ridge line segment traversed in the deformation process of the ridge line segments is deleted from the initial ridge line segment list, so as to prevent the initial ridge line from searching for the same path again in a subsequent iteration cycle, thereby improving the extraction rate of the centerline.

The iterative stop condition may be one of the followings: the deformation of the ridge line segment exceeds a border of a region (for example, a border of a predefined deformable region) defined by the regularized open snake deformable model; a displacement of two ends of the ridge line segment under the effect of the deformation forces at the two ends is less than a preset value (this preset value may be set according to the extraction accuracy and the extraction rate required by a user); the deformation forces at the two ends of the ridge line segment disappear; and the ridge line segment encounters the ridge line segment in the initial ridge line segment in the deformation process.

In the embodiment of the present disclosure, after one initial ridge line segment is deformed, another ridge line segment is selected from the updated initial ridge line segment list, and the same process is performed on the reselected ridge line segment. The same process is performed on the ridge line segment in the initial ridge line segment list repeatedly until there are no ridge line segments in the initial ridge line segment list.

In step 5104, if the deformation end condition is met, the centerline of the tubular object is generated based on all the centerline segments of the tubular object obtained.

In the embodiment of the present disclosure, when there are no ridge line segments in the initial ridge line segment list, it indicates that the deformation end condition is met. At this time, the centerline of the tubular object is generated based on all the centerline segments, corresponding to the multiple deformed ridge line segments, of the tubular object.

Those ordinarily skilled in the art may understand that all or a part of steps in implementing the method of the above embodiment may be accomplished by instructing related hardware via a program, and the program may be stored in a computer-readable storage medium, such as a ROM/RAM, a magnetic disc, an optical disc, and the like.

Embodiment II

Figure 2:
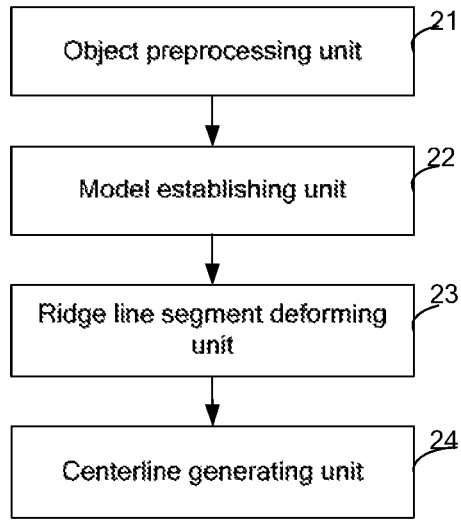
FIG. 2 is a schematic diagram illustrating a structure of an apparatus for extracting a centerline of a tubular object according to Embodiment II of the present disclosure.

FIG. 2 shows a structure of an apparatus for extracting a centerline of a tubular object according to Embodiment II of the present disclosure. For ease of description, only parts related to the embodiment of the present disclosure are shown. The apparatus includes an object preprocessing unit 21, a model establishing unit 22, a ridge line segment deforming unit 23 and a centerline generating unit 24.

The object preprocessing unit 21 is configured to preprocess, through a preset tubular object enhancement algorithm, an image of a tubular object whose centerline is to be extracted to obtain an enhanced image of the tubular object, and acquire a gradient vector flow field of the enhanced image through a preset iterative algorithm.

In the embodiment of the present disclosure, when the image of the tubular object whose centerline is to be extracted is preprocessed by the object preprocessing unit, an existing tubular object enhancement algorithm such as a multi-scale filtering algorithm may be used to suppress a background noise of the image of the tubular object whose centerline is to be extracted and increase the brightness of the tubular object in the image, such that the center of the tubular object has higher image intensity information, and a border and a background of the tubular object have dim intensity information. After the enhanced image is obtained, the gradient vector flow field of the enhanced image is computed for describing a curved segment in the enhanced image. An existing iterative algorithm may be used when the gradient vector flow field of the enhanced image is acquired.

The model establishing unit 22 is configured to extract, based on the gradient vector flow field, ridge points of the tubular object from the enhanced image and generate an initial ridge line segment list, acquire a deformation force parameter corresponding to the initial ridge line segment list based on the gradient vector flow field, and establish a regularized open snake deformable model based on the initial ridge line segment list and the deformation force parameter.

In the embodiment of the present disclosure, after the ridge points of the tubular object are extracted from the enhanced image, several line segments with a length of a preset number (for example, five) of volume pixels may be directly generated based on the ridge points to form the initial ridge line segment list, or longer ridge lines of the tubular object may be rapidly extracted through ridge points tracking technology to form the initial ridge line segment list.

In the embodiment of the present disclosure, there are a total of N initialized ridge line segments (open snakes) in the initial ridge line segment list generated, and each snake is expressed as $C_n = [X, V, F_T]_n$, where n=1, 2, . . . . N, "X" represents a three-dimensional coordinate (x, y, z) of each point, "V" represents a unit direction vector $(v_x, v_y, v_z)$ of each point and "$F_T$" represents a GVF (gradient vector flow field) vector $(f_x, f_y, f_z)$ of each point. A dynamic data structure component of each open snake may be represented by the following matrix, where $M_n$ represents a length (pixel unit) of the snake:

$$\begin{bmatrix} x_1 & y_1 & z_1 & v_{x1} & v_{y1} & v_{z1} & f_{x1} & f_{y1} & f_{z1} \\ x_2 & y_2 & z_2 & v_{x2} & v_{y2} & v_{z2} & f_{x2} & f_{y2} & f_{z2} \\ M & M & M & M & M & M & M & M & M \\ x_{M_n} & y_{M_n} & z_{M_n} & v_{x_{M_n}} & v_{y_{M_n}} & v_{z_{M_n}} & f_{x_{M_n}} & f_{y_{M_n}} & f_{z_{M_n}} \end{bmatrix}.$$

Preferably, after the gradient vector flow field $E_\tau$ of the enhanced image is acquired, an image force $-\nabla E_\tau$ in the deformation force parameter is acquired based on the gradient vector flow field, so that the deformation accuracy is improved.

The ridge line segment deforming unit 23 is configured to: if a preset deformation end condition is not met, deform one ridge line segment in the initial ridge line segment list based on the regularized open snake deformable model, uniformly smooth a sequence of points of the ridge line segment deformed through a preset smoothing algorithm to obtain a centerline segment, corresponding to the ridge line segment deformed, of the tubular object, and update the initial ridge line segment list based on the ridge line segment traversed in the deformation process of the ridge line segments.

In the embodiment of the present disclosure, firstly, one ridge line segment in the initial ridge line segment list is deformed, and when the deformation is performed, a cyclic iterative computation is performed on the regularized open snake deformable model under the effect of deformation forces so as to deform this ridge line segment based on a result of the computation. When an iteration stop condition is met, a deformed ridge line segment corresponding to this ridge line segment is obtained. Secondly, a sequence of points of the deformed ridge line segment is uniformly smoothed through a preset algorithm (for example, an equal interval interpolation algorithm) to obtain the centerline segment, corresponding to the deformed ridge line segment, of the tubular object. Finally, the initial ridge line segment list is updated based on the ridge line segment traversed in the deformation process of the ridge line segments.

Particularly, the deformation force of the ridge line segment is computed according to a formula $F_{ext} = -\nabla E_\tau - k_S \nabla E_S$, where $-k_S \nabla E_S$ represents a tearing force, a point $X_i(x, y, z)$ on the ridge line segment moves in an iterative deformation process of the ridge line segment according to a formula $X_{i+1} = (A + \gamma I)^{-1} \cdot (\gamma X_t - k_N F_N(X_i) - k_S F_S(X_t))$, where "t" represents a number of iterations and "A" represents a matrix composed of elastic coefficients and rigid coefficients, I represents a unit matrix, $\gamma$, $k_N$ and $k_S$ represent constants used to control a step length, balance an internal force and an external force, and balance the image force and the tearing force, "$F_N$" represents a force perpendicular to the centerline, and "$F_S$" represents a force along the centerline.

Preferably, when the initial ridge line segment list is updated based on the ridge line segment traversed in the deformation process of the ridge line segments, the ridge line segment traversed in the deformation process of the ridge line segments is deleted from the initial ridge line segment list, so as to prevent the initial ridge line from searching for the same path again in a subsequent iteration cycle, thereby improving the extraction rate of the centerline.

The iterative stop condition may be one of the followings: the deformation of the ridge line segment exceeds a border of a region (for example, a border of a predefined deformable region) defined by the regularized open snake deformable model; a displacement of two ends of the ridge line segment under the effect of the deformation forces at the two ends is less than a preset value (this preset value may be set according to the extraction accuracy and the extraction rate required by a user); the deformation forces at the two ends of the ridge line segment disappear; and the ridge line segment encounters the ridge line segment in the initial ridge line segment in the deformation process.

In the embodiment of the present disclosure, after one initial ridge line segment is deformed, another ridge line segment is selected from the updated initial ridge line segment list, and the same process is performed on the reselected ridge line segment. The same process is performed on the ridge line segment in the initial ridge line segment list repeatedly until there are no ridge line segments in the initial ridge line segment list.

The centerline generating unit 24 is configured to generate the centerline of the tubular object based on all the centerline segments of the tubular object obtained when the deformation end condition is met.

In the embodiment of the present disclosure, when there are no ridge line segments in the initial ridge line segment list, it indicates that the deformation end condition is met. At this time, the centerline of the tubular object is generated based on all the centerline segments, corresponding to the multiple deformed ridge line segments, of the tubular object.

Figure 3:
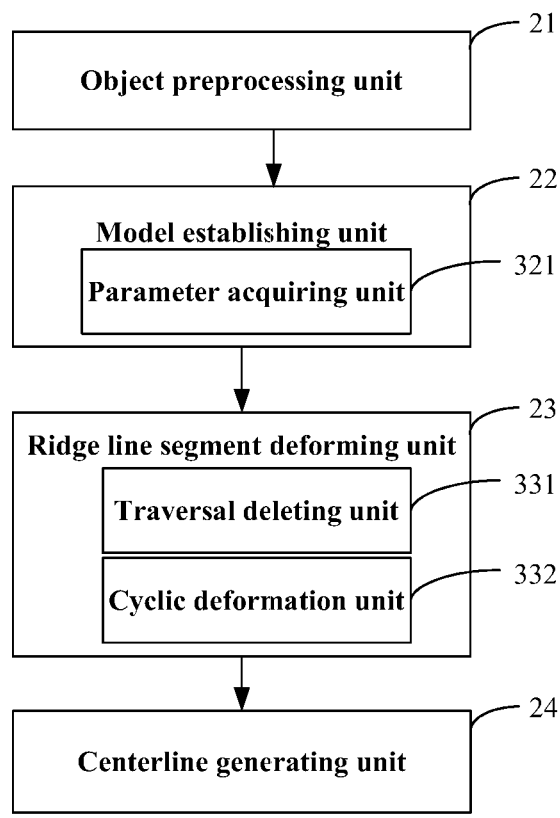
FIG. 3 is a schematic diagram illustrating a preferred structure of the apparatus for extracting the centerline of a tubular object according to Embodiment II of the present disclosure.

Accordingly, preferably, as shown in FIG. 3, the model establishing unit 22 includes:

a parameter acquisition unit 321 configured to acquire an image force $-\nabla E_\tau$ in a deformation force parameter based on the gradient vector flow field $E_\tau$.

Preferably, the ridge line segment deforming unit 23 includes:

a traversal deleting unit 331 configured to delete the ridge segment traversed in the deformation process of the ridge line segments from the initial ridge line segment list; and a cyclic deformation unit 332 configured to perform a cyclic iterative computation on the regularized open snake deformable model under the effect of deformation forces, so as to deform the ridge line segment based on a result of the computation, and obtain the ridge line segment deformed when the iteration stop condition is met.

In the embodiment of the present disclosure, each unit of the apparatus for extracting the centerline of the tubular object may be implemented by a corresponding hardware or software unit. Each unit may be an independent software and hardware unit, or may be integrated into a software and hardware unit, which is not intended to limit the present disclosure herein.

The foregoing descriptions are merely preferred embodiments of the present disclosure and are not intended to limit the present disclosure. Any modifications, equivalent substitutions and improvements made within the spirit and principle of the present disclosure shall be included in a protective scope of the present disclosure.

What is claimed is:

1. A method for extracting a centerline of a tubular object, comprising:

preprocessing, through a preset tubular object enhancement algorithm, an image of the tubular object whose centerline is to be extracted to obtain an enhanced image of the tubular object, and acquiring a gradient vector flow field of the enhanced image through a preset iterative algorithm;

extracting, based on the gradient vector flow field, ridge points of the tubular object from the enhanced image and generating an initial ridge line segment list, acquiring a deformation force parameter corresponding to the initial ridge line segment list based on the gradient vector flow field, and establishing a regularized open snake deformable model based on the initial ridge line segment list and the deformation force parameter;

selecting one ridge line segment from the initial ridge line segment list, deforming the one ridge line segment based on the regularized open snake deformable model, uniformly smoothing a sequence of points of the ridge line segment deformed through a preset smoothing algorithm to obtain a centerline segment, corresponding to the ridge line segment deformed, of the tubular object, updating the initial ridge line segment list based on the ridge line segment traversed in a deformation process of the ridge line segments, determining whether no ridge line segment exists in the updated ridge line segment list, and if another ridge line segment exists in the updated ridge line segment list, selecting the another ridge line segment from the updated ridge line segment list and repeating the steps of deforming, smoothing, updating and determining; and generating the centerline of the tubular object based on all the centerline segments of the tubular object obtained if no ridge line segment exists in the updated ridge line segment list;

wherein a point $X_t(x, y, z)$ on the ridge line segment moves in an iterative deformation process of the ridge line segment according to the following formula:

$$X_{t+1} = (A+\gamma I)^{-1} \cdot (\gamma X_t - k_N F_N(X_t) - k_S F_S(X_t)),$$

where t represents a number of iterations and A represents a matrix composed of elastic coefficients and rigid coefficients, I represents a unit matrix, $\gamma$, $k_n$ and $k_s$ represent constants used to control a step length, balance an internal force and an external force, and balance the image force and the tearing force, $F_N$ represents a force perpendicular to the centerline, and $F_S$ represents a force along the centerline.

2. The method according to claim 1, wherein the updating the initial ridge line segment list based on the ridge line segment traversed in a deformation process of the ridge line segments comprises:

deleting the ridge line segment traversed in the deformation process of the ridge line segments from the initial ridge line segment list.

3. The method according to claim 1, wherein the acquiring a deformation force parameter corresponding to the initial ridge line segment list based on the gradient vector flow field comprises:

acquiring an image force in the deformation force parameter based on the gradient vector flow field.

4. The method according to claim 1, wherein the deforming one ridge line segment in the initial ridge line segment list based on the regularized open snake deformable model comprises:

performing a cyclic iterative computation on the regularized open snake deformable model under the effect of deformation forces so as to deform the ridge line segment based on a result of the computation, and acquiring the ridge line segment deformed when an iteration stop condition is met.

5. The method according to claim 4, wherein the iterative stop condition is one of the followings: deformation of the ridge line segment exceeds a border of a region defined by the regularized open snake deformable model; a displacement of two ends of the ridge line segment under the effect of the deformation forces at the two ends is less than a preset value; the deformation forces at the two ends of the ridge line segment disappear; and the ridge line segment encounters the ridge line segment in the initial ridge line segment in the deformation process.

6. An apparatus for extracting a centerline of a tubular object, comprising: a processor and a storage device for storing computer executable instructions that when executed by the processor cause the processor to perform operations of following units:

an object preprocessing unit configured to preprocess, through a preset tubular object enhancement algorithm, an image of the tubular object whose centerline is to be extracted to obtain an enhanced image of the tubular object, and acquire a gradient vector flow field of the enhanced image through a preset iterative algorithm;

a model establishing unit configured to extract, based on the gradient vector flow field, ridge points of the tubular object from the enhanced image and generate an initial ridge line segment list, acquire a deformation force parameter corresponding to the initial ridge line segment list based on the gradient vector flow field, and establish a regularized open snake deformable model based on the initial ridge line segment list and the deformation force parameter;

a ridge line segment deforming unit configured to: select one ridge line segment from the initial ridge line segment list deform the one ridge line segment based on the regularized open snake deformable model, uniformly smooth a sequence of points of the ridge line segment deformed through a preset smoothing algorithm to obtain a centerline segment, corresponding to the ridge line segment deformed, of the tubular object, update the initial ridge line segment list based on the ridge line segment traversed in a deformation process of the ridge line segments, determine whether no ridge line segment exists in the updated ridge line segment list, and if another ridge line segment exists in the updated ridge line segment list, select the another ridge line segment from the updated ridge line segment list and repeat the operations of deforming, smoothing, updating and determining; and a centerline generating unit configured to generate the centerline of the tubular object based on all the centerline segments of the tubular object obtained if no ridge line segment exists in the updated ridge line segment list:

wherein a point $X_t(x, y, z)$ on the ridge line segment moves in an iterative deformation process of the ridge line segment according to a following formula:

$$X_{t+1} = (A+\gamma I)^{-1} \cdot (\gamma X_t - k_N F_N(X_i) - k_S F_S(X_t)),$$

where t represents a number of iterations and A represents a matrix composed of elastic coefficients and rigid coefficients, I represents a unit matrix, $\gamma$, $k_n$ and $k_s$ represent constants used to control a step length, balance an internal force and an external force, and balance the image force and the tearing force, $F_N$ represents a force perpendicular to the centerline, and $F_S$ represents a force along the centerline.

7. The apparatus according to claim 6, wherein the ridge line segment deforming unit comprises:

a traversal deleting unit configured to delete the ridge line segment traversed in the deformation process of the ridge line segments from the initial ridge line segment list.

8. The apparatus according to claim 6, wherein the model establishing unit comprises:
   a parameter acquisition unit configured to acquire an image force in the deformation force parameter based on the gradient vector flow field.

9. The apparatus according to claim 6, wherein the ridge line segment deforming unit comprises:
   a cyclic deformation unit configured to perform a cyclic iterative computation on the regularized open snake deformable model under the effect of deformation forces, so as to deform the ridge line segment based on a result of the computation, and obtain the ridge line segment deformed when an iteration stop condition is met.

10. The apparatus according to claim 9, wherein the iterative stop condition is one of the followings: the deformation of the ridge line segment exceeds a border of a region defined by the regularized open snake deformable model; a displacement of two ends of the ridge line segment under the effect of the deformation forces at the two ends is less than a preset value; the deformation forces at the two ends of the ridge line segment disappear; and the ridge line segment encounters the ridge line segment in the initial ridge line segment in the deformation process.

* * * * *